(12) United States Patent
Lamberts et al.

(10) Patent No.: US 6,947,234 B2
(45) Date of Patent: Sep. 20, 2005

(54) METHOD, SYSTEM, AND PROGRAM FOR PERFORMING ERROR CORRECTION IN A STORAGE DEVICE HAVING A MAGNETIC STORAGE MEDIUM

(75) Inventors: Bernd Lamberts, Cupertino, CA (US); William Harlow McConnell, Los Altos, CA (US); Adam Daniel Polcyn, San Jose, CA (US); Frank J. Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 10/202,672

(22) Filed: Jul. 23, 2002

(65) Prior Publication Data

US 2004/0017629 A1 Jan. 29, 2004

(51) Int. Cl.[7] ................................................ G11B 5/09
(52) U.S. Cl. .......................... 360/53; 360/31; 360/39; 360/25
(58) Field of Search ............................ 360/53, 39, 51, 360/31, 75, 25, 43, 65

(56) References Cited

U.S. PATENT DOCUMENTS

| 5,265,082 A | 11/1993 | Gniewek et al. | |
|---|---|---|---|
| 5,392,290 A | 2/1995 | Brown et al. | |
| 6,266,199 B1 | 7/2001 | Gillis et al. | |
| 6,266,201 B1 | 7/2001 | Dahlerud et al. | |
| 6,359,744 B1 | 3/2002 | Mallary | |
| 6,429,984 B1 * | 8/2002 | Alex | 360/53 |
| 6,700,723 B2 * | 3/2004 | Li | 360/53 |
| 2001/0010603 A1 | 8/2001 | Uzumaki et al. | |

FOREIGN PATENT DOCUMENTS

| GB | 2355106 A | 4/2001 |
|---|---|---|
| JP | 6062635 | 2/1994 |
| JP | 2000099905 | 4/2000 |

OTHER PUBLICATIONS

IBM, "Prevention of Hard Errors in Magnetic Files Due to Long Term Degradation", IBM Technical Disclosure Bulletin, vol. 29, No. 10, Mar. 1987, pp. 4577–4578.

IBM, "Preventative Rewrites", IBM Technical Disclosure Bulletin, vol. 33, No. 12, May 1991, pp. 331–332.

IBM Corp., "IBM Research News" [online], 2001, pp. 1–4, [Retrieved on Apr. 12, 2002]. Retrieved from the Internet at <URL: http://www.research.ibm.com/resources/news/20010518_whitepaper.shtml>.

D.A. Thompson, et al., "The Future of Magnetic Data Storage Technology", IBM J. Res. Develop., vol. 44, No. 3, May 2000, pp. 311–322.

J.R. Hoinville, "Thermal Decay of Longitudinal Recording Media with Irregular Grain Shapes", Manuscript, [online] Oct. 2000, pp. 1–3. Retrieved from the Internet at <URL: http://www.euxime.com/FR11.pdf>.

* cited by examiner

Primary Examiner—David Hudspeth
Assistant Examiner—Natalia Figueroa
(74) Attorney, Agent, or Firm—David W. Victor; Konrad Raynes & Victor LLP

(57) ABSTRACT

Provided are a method, system, and program for performing error correction in a storage device having a magnetic storage medium. A plurality of zones are defined in the magnetic storage medium, wherein each zone comprises a plurality of addressable locations in the magnetic storage medium. A determination is made as to whether a change of a signal-to-noise ratio for one subject zone of the plurality of zones exceeds a threshold. An operation is performed to improve the signal-to-noise ratio with respect to the subject zone of the magnetic storage medium after determining that the change of the signal-to-noise ratio exceeds the threshold.

35 Claims, 3 Drawing Sheets

METHOD, SYSTEM, AND PROGRAM FOR PERFORMING ERROR CORRECTION IN A STORAGE DEVICE HAVING A MAGNETIC STORAGE MEDIUM

BACKGROUND OF THE INVENTION

1. Field of the Invention

The present invention relates to a method, system, and program for performing error correction in a storage device having a magnetic storage medium.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. MR heads typically are affixed to an actuator or arm that glides across the disk surface to position the head at different track locations. The disk surface on which the data is written comprises a magnetic storage medium that is composed of magnetic grains. A magnetic grain comprises a collection of atoms which can be polarized as a unit in one direction. Each bit is comprised of a group of magnetic grains, where the bit indicates a value if a sufficient amount of the magnetic grains that comprise the bit are oriented in the direction of a discernible charge, i.e., a "0" or "1" orientation, where the MR head reads the charge.

Errors are introduced when the grains for a bit switch their orientation. If enough grains switch their orientation in response to the introduction of noise from various sources, such as heat or other magnetic fields, then the signal to noise (S/N) ratio for that bit decreases. If the noise increases to a certain point, then the intended orientation of the bit may not be determinable. One factor contributing to this drift in the orientation of the magnetic grains is thermal decay. The thermodynamics or heat of the disk system may cause grains to switch their orientation, thus increasing noise and possibly leading to disk errors.

In order to increase the linear density of disk drives, i.e., the tracks per inch, more bits and tracks must be packed onto the disk surface. One common technique for increasing disk density is to reduce the magnetic grain size to allow a greater number of grains and hence bits to fit on the magnetic recording surface. However, as the size and volume of the magnetic grains decrease, the grains become more susceptible to assuming a random value, i.e., switching their magnetic orientation, as a result of thermal decay thereby introducing more noise into the system.

Another factor introducing noise into the system is known as adjacent track interference (ATI). Adjacent track interference results from a write head, which may be writing on track, affecting the magnetic orientation of grains in adjacent bits, thereby introducing further noise into the system.

One prior art technique for remedying the noise introduced by thermal decay and ATI is to periodically reread and rewrite the data. Rewriting the data reorients the magnetic grains toward the intended charge, including any grains whose orientation switched as a result of thermal decay and misregistration. Prior art techniques will periodically perform this reread and rewrite operation to eliminate the introduced noise. To determine how often to perform the read and write operation, prior art techniques will design a thermal decay formula for a disk based on the characteristics of the disk to estimate the bit decay rate. The period for performing the reread and rewrite operation is sometimes set to a period that must pass before the amount of decay, i.e., change in the signal-to-noise ratio, reaches a threshold value based on the thermal decay equation.

Notwithstanding such prior art techniques for reversing the effects of thermal decay and other problems related to the addition of noise in the system, there is a need in the art for continued advancements in the area of reducing disk noise and degradation of the signal-to-noise ratio.

SUMMARY OF THE PREFERRED EMBODIMENTS

Provided are a method, system, and program for performing error correction in a storage device having a magnetic storage medium. A plurality of zones are defined in the magnetic storage medium, wherein each zone comprises a plurality of addressable locations in the magnetic storage medium. A determination is made as to whether a change of a signal-to-noise ratio for one subject zone of the plurality of zones exceeds a threshold. An operation is performed to improve the signal-to-noise ratio with respect to the subject zone of the magnetic storage medium after determining that the change of the signal-to-noise ratio exceeds the threshold.

In further implementations, the determination of the change of signal-to-noise ratio for the subject zone comprises estimating the change of the signal-to-noise ratio as a result of at least one of thermal decay and adjacent track interference.

Still further, the operation performed may comprise reading a binary value from each address in the zone and writing the read binary value back to each address in the zone.

Further provided are a method, system, and program for performing error correction in a storage device having a magnetic storage medium. A change of a signal-to-noise ratio for at least part of the magnetic storage medium is estimated based on a combination of changes to the signal-to-noise ratio estimated from at least two different decay equations based on different factors. A determination is made as to whether the change of the signal-to-noise ratio exceeds a threshold. An operation is performed with respect to the magnetic storage medium after determining that the change of the signal-to-noise ratio exceeds the threshold.

Still further, a time that has elapsed since the operation was last performed and a number of writes performed with respect to the magnetic storage medium since the operation was last performed are maintained. In such implementations, one decay equation estimates the change in the signal-to-noise ratio as a function of the time that has elapsed and another decay equation estimates the signal-to-noise ratio as a function of the number of writes.

Further, the equation that estimates the change in the signal-to-noise ratio as the function of the time that has elapsed comprises a thermal decay equation and the equation that estimates the change in the signal-to-noise ratio as the function of the number of writes considers an effect of a write operation on adjacent locations.

Described implementations provide a technique for more accurately determining the change in signal-to-noise ratio for a magnetic storage medium to determine when to perform an operation to correct any degradation in the signal-to-noise ratio.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
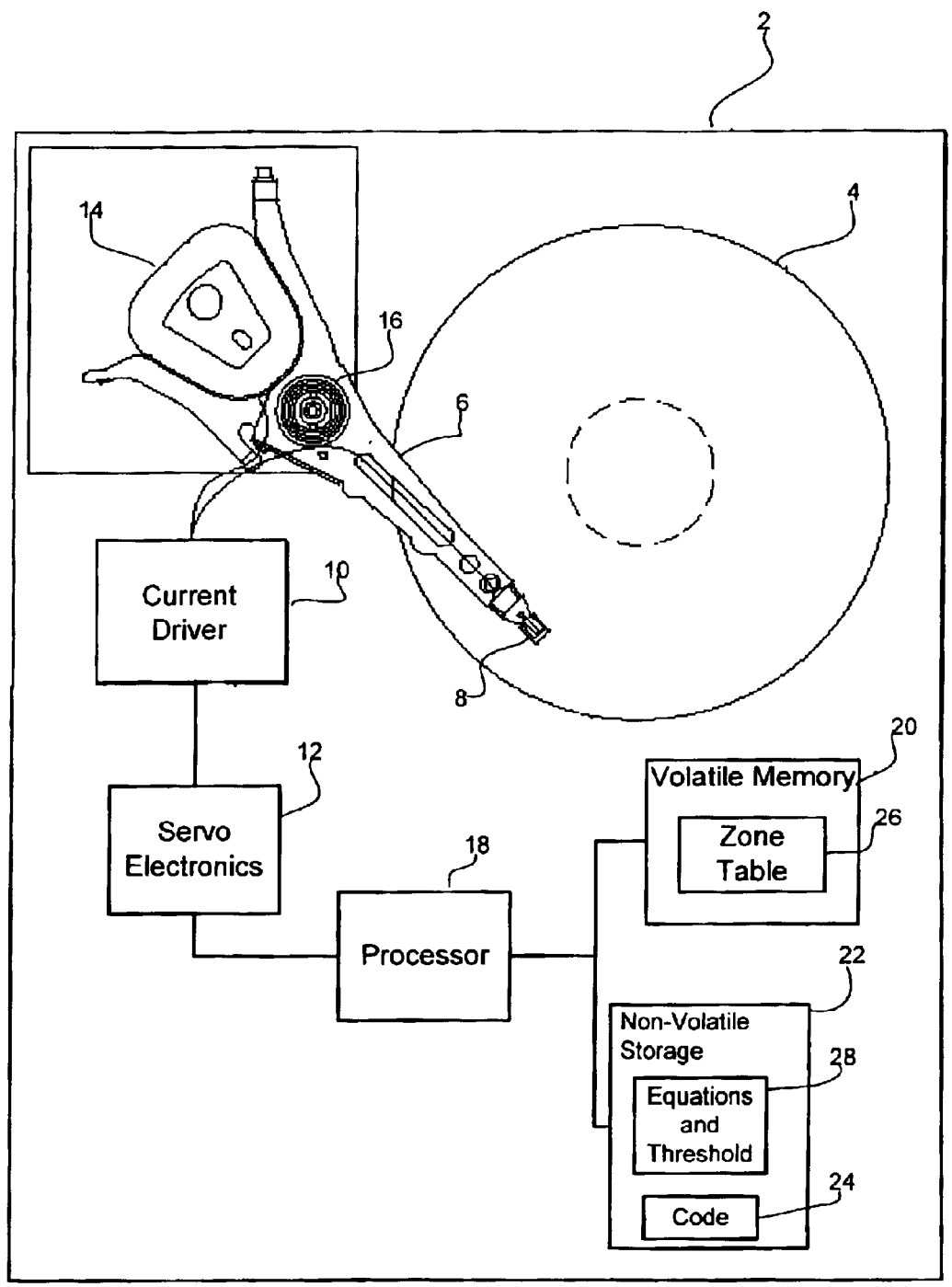
FIG. 1 illustrates a disk drive architecture in which aspects of the invention are implemented.

FIG. 1 illustrates a disk drive system 2, including one or more rotating disks 4 (only one is shown), an actuator assembly 6 to move a head assembly 8 across the disk 4 surface. The disk drive system 2 further includes a current driver 10 that converts the digital signal from servo electronics 12 or processor 18 to actual current that is applied to a voice coil motor (VCM) 14. The VCM 14 comprises a coil that sits between two magnets. In response to the current from the current driver 10, the VCM 14 causes the arm of the actuator to move through a magnetic field. The actuator 6 pivots around a shaft 16 in response to the torque produced by the VCM 14.

In certain implementations, the head 8 is a magnetoresistive (MR) head device. However, in alternative implementations, the head 8 may be constructed of other materials known in the art. The servo electronics 12 provides a closed loop feedback system to insure that the head follows the tracks accurately and to control smooth transitions when the head "seeks" from one track location to another track.

A processor 18 manages read/write operations and performs other disk related operations. The processor 18 utilizes a volatile memory 20, such as a random access memory (RAM) or registers, as a working memory in which instructions and data are temporarily loaded for program execution. A non-volatile storage 22, such as a read-only memory (ROM), programmable ROM (PROM), electronically programmable ROM (EPROM), flash memory, etc., stores program instructions and constants, referred to as code 24, loaded and executed by the processor 18 to perform the disk drive operations. Alternatively, the code 24 described herein as performed by processor 18 along with the volatile memory 20 and non-volatile storage 22 may be implemented as part of integrated an hardware component, such as an Application Specific Integrated Circuit (ASIC).

Figure 2:
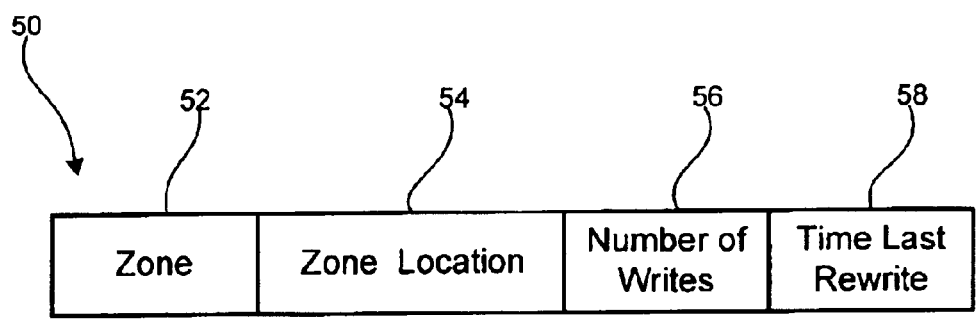
FIG. 2 illustrates the fields used to provide information on zones in a magnetic storage medium in accordance with implementations of the invention.

In described implementations, the processor 18 maintains in memory 20 a zone table 26 that provides information on predefined regions of the disk surface. FIG. 2 illustrates the fields in an entry 50 of the zone table 26 providing information on a zone of the disk. A zone 52 identifies a particular zone, such as a unique zone number. The zones may be consecutively numbered, e.g., 0, 1 . . . 100. A zone location field 54 provides the addresses on the disk surface 4 that comprise the zone.

The zones may define concentric regions of the disk 4 or pie-like slices of the disk. Additionally, the zones may comprise any possible groupings of contiguous or noncontiguous addresses. Further, there may be any number of zones. Each zone may have a same number of addresses or a different number of addresses. A number of writes field 56 indicates the number of write operations that have been performed with respect to bits or addresses within a particular zone. A time of last rewrite 58 field indicates a time or timestamp when a rewrite was last performed with respect to the zone. In described implementations, after a threshold estimated decay is reached for a zone, the bits in the zone would be read and rewritten back to the same location to remove any noise introduced as a result of thermal decay and adjacent track interference.

The non-volatile storage 22 includes equations and thresholds 28 that used to determine when to rewrite the data to reset the magnetic orientation of all of the magnetic grains in a zone. The equations and thresholds 28 include a thermal decay equation, known in the art, that estimates a change of the signal-to-noise ratio as a function of time, based on the thermodynamic profile of the disk 4 and other factors. The equations and thresholds 28 further include an adjacent track interference (ATI) decay equation that expresses the change of the signal-to-noise ratio as a function of the number of writes. The equations and thresholds 28 and zone table 26 may be maintained in non-volatile memory 22, and loaded into volatile memory 20 for using during disk operations.

The ATI decay equation may be determined empirically by considering the strength of a magnetic field needed to switch a magnetic grain orientation, which is dependent on the volume of the grain, i.e., a smaller grain can be switched easier than a larger grain; the thermodynamic profile of the drive 2, which considers the thermal effects that will switch the orientation of the grain; and the field strength of the write head on an adjacent track, i.e., a write head having greater magnetic field strength is more likely be able to switch the orientation of a magnetic grain in an adjacent track.

Alternatively, the ATI decay equation can also be determined during the manufacture of the disk by measuring the ATI response and using interpolation based on the characterization and features of the particular drive. In this way, the ATI decay equation is tailored for a particular drive. These and other factors may be considered when empirically modeling an ATI decay equation to indicate the change in the signal-to-noise ratio as a function of the number of write operations.

Figure 3:
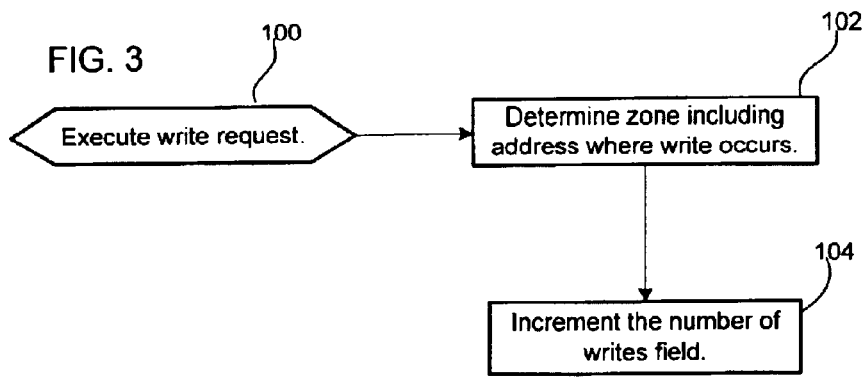
FIGS. 3 and 4 illustrate logic to determine when to remedy degradation in the signal-to-noise ratio in accordance with implementations of the invention.

FIG. 3 illustrates logic implemented in the code 24 executed by the processor 18 to determine when to perform the rewrite operation to restore the signal-to-noise ratio to the initial state and remove the effects of thermal and ATI decay. Upon executing (at block 100) a write request, the processor 18 determines (at block 102) the zone 52 having a zone location 54 that includes the address where the write occurs and increments (at block 104) the number of writes 56 field.

Figure 4:
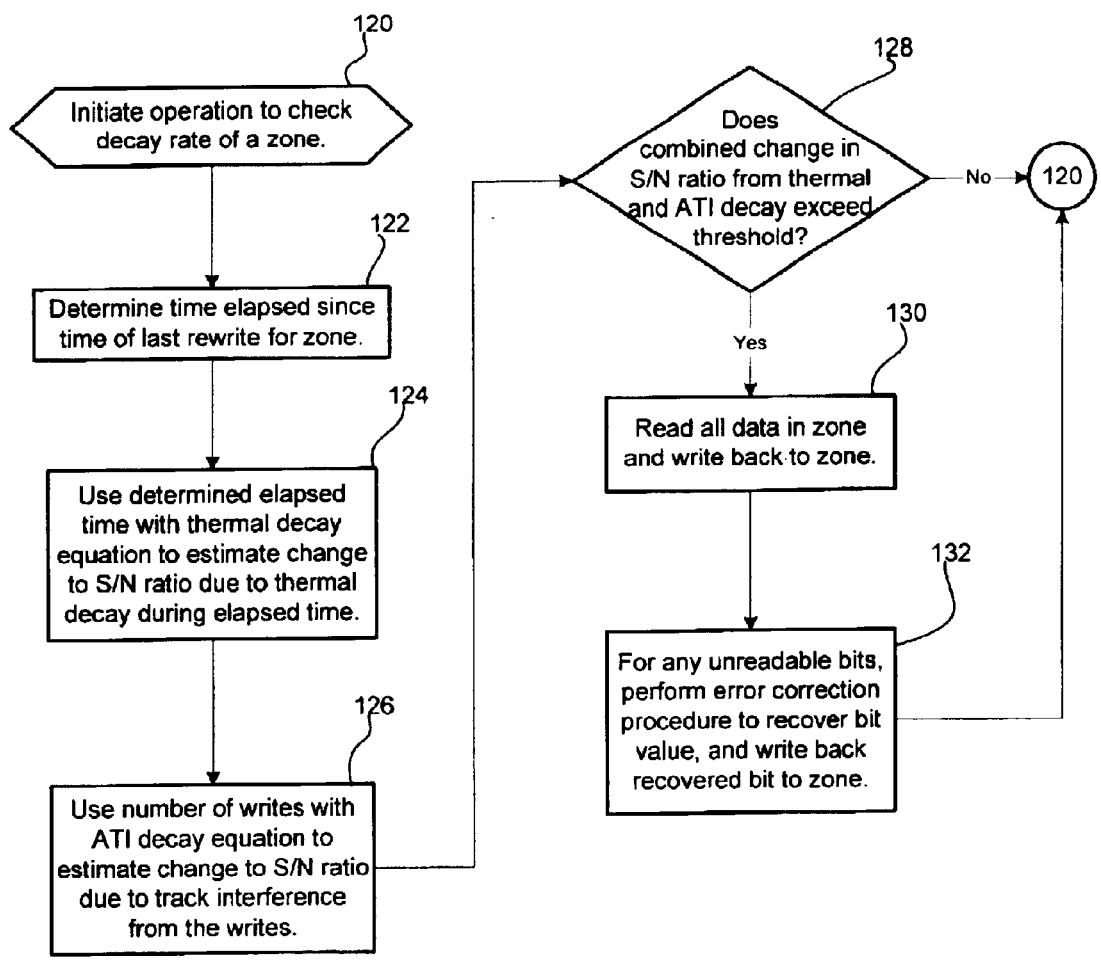

FIG. 4 illustrate logic in the code 24 to determine whether a change in the signal-to-noise ratio as a result of estimated thermal and ATI decay exceeds a threshold, thereby indicating to perform a rewrite operation. This logic may be invoked for all zones at periodic intervals. Alternatively, the logic may be invoked for a particular zone after a write operation is performed at an address within such zone or after a predetermined number of writes have occurred since the invocation of the logic with respect to a particular zone. Upon invoking (at block 120) the operation to check the change in the signal-to-noise (S/N) ratio, the processor 18 determines (at block 122) the time elapsed since the last rewrite operation in field 56. The processor 18 uses (at block 124) the determined elapsed time with the thermal decay equation to estimate a change in the signal-to-noise ratio due to thermal decay over the elapsed time. The processor 18 further uses (at block 126) the number of writes indicated in field 56 with the ATI decay equation to determine a change in the signal-in-noise (S/N) ratio due to adjacent track interference. If (at block 128) the combined change in the signal-in-noise (S/N) ratio due to both thermal and ATI decay exceeds a predetermined threshold, then the processor 18 instructs (at block 130) the servo electronics 12 to read all the addresses in the zone being considered and write the read data back to their address locations. If the decay is significant, then certain bits may be unreadable, or not result in a sufficiently strong signal to indicate a discernable value, i.e., 0 or 1. In such case, the processor 18 may perform (at block 132) an error recovery operation to determine the value for the indiscernible bit location and then write such recovered bit value back to the zone. The error recovery operation may involve any error recovery procedure known in the art, such as a technique that uses an error correction code, e.g., a Longitudinal Redundancy Check (LRC) code. For any bits From block 128 or 132, control proceeds back to block 120 to periodically check the decay rate for the zone. In this way, the decision to rewrite and reorient the bit grains is based on both thermal decay and the ATI decay, which provides a more accurate picture of the degradation in the signal-to-noise ratio.

With the logic of FIGS. 3 and 4, the write activity is monitored with respect to zones of the disk comprising predefined addresses. As discussed the zones may define concentric regions of the disk 4 or pie-like slices of the disk and may comprise any possible groupings of contiguous or non-contiguous addresses. Moreover, the zones may define addresses on multiple tracks, a single track, a sector, and even be defined as narrow as a single logical block address (LBA). In further implementations, certain zones may be defined into various subzones, where write activity for certain zones is monitored on a subzone basis to provide for the rewrite operation with respect to such subzones on a more frequent basis. For instance, a zone including specific types of data, such as frequently accessed data, e.g., the File Allocation Table (FAT), may be further defined into subzones. Information on such subzones may be maintained in the same or a different zone table 26 and have all the zone fields shown in FIG. 2 as well as additional fields providing subzone identification information with a parent zone to allow for decay checking in such subzones. In this way, certain regions may be monitored and rewritten more frequently. Zones having more frequently accessed addresses would likely have a higher ATI decay rate due to a higher frequency of write operations.

The described implementations provide techniques to determine when to perform a rewrite to avoid further degradation of the signal-to-noise ratio in a manner that takes into account both thermal decay and adjacent track interference. By providing a more accurate picture of the signal-to-noise ratio that considers multiple contributing factors, described implementations increase the likelihood that the rewrite operation will occur before the signal-to-noise ratio decays to unacceptable levels, such that an unacceptable number of address locations cannot be read.

Additional Implementation Details

The described disk management operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

When performing the rewrite operation, the processor may also perform additional operations, such as verifying data and determining whether there are any bad sectors, and, if so, reassign the data to another location or perform data recovery operations.

Certain implementations were described with respect to MR heads. However, the head assembly 8 may be implemented with read and/or write heads other than MR heads, e.g., ferrite, MIG, thin film, GMR, one-sided, two-sided, etc., to determine non-mechanical noise arising from structural defects.

The described implementations may be implemented in disk drives that include multiple platters and multiple heads to read from one or both surfaces of each platter.

The described implementations provided checking of the decay rate for magnetic hard disk drives. Additionally, the described implementations may be used with other magnetic storage devices, such as magnetic tape, where data can be effected by thermal and ATI decay.

In the described implementations, the thermal and ATI decay was examined on a zone-by-zone basis. In alternative implementations, either the thermal or ATI decay, or some other decay factor, may be examined on a zone-by-zone basis. Alternatively, the zone may comprise the entire disk, wherein the determination of whether to perform the rewrite operation is based on the estimated thermal and ATI decay for the entire disk surface.

The logic of FIGS. 3 and 4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing error correction in a storage device having a magnetic storage medium, comprising:
   defining a plurality of zones in the magnetic storage medium, wherein each zone comprises a plurality of addressable locations in the magnetic storage medium;
   determining a change of a signal-to-noise ratio for one subject zone using information on writes to the subject zone;
   determining whether the determined change of the signal-to-noise ratio or the subject zone exceeds a threshold; and
   performing an operation to improve the signal-to-noise ratio with respect to the subject zone of the magnetic storage medium after determining that the change of the signal-to-noise ratio exceeds the threshold.

2. The method of claim 1, wherein determining the change of the signal-to-noise ratio for the subject zone comprises estimating the change the signal-to-noise ratio as a result of adjacent track interference.

3. The method of claim 1, wherein the operation performed comprises reading a binary value front each address in the zone and writing the read binary value back to each address in the zone.

4. The method of claim 3, wherein the operation further comprises verifying data at the address locations in the zone and performing data repair operations at the addresses in the zone if errors are detected during the operation.

5. The method of claim 3, further comprising:
   performing an error recovery operation if a binary value from an address cannot be read to determine the binary value for the address; and
   writing the determined binary value to the address in the zone.

6. The method of claim 1, wherein the information on the writes for each zone comprises a number of writes indicating the number of writes performed since the operation was last performed with respect to the zone, and wherein determining the change of the signal-to-noise ratio for the subject zone further comprises:
   determining the number of writes for the subject zone; and
   using an equation that takes into account an effect of a write operation adjacent bits as a function of the determined number of writes to estimate the change in the signal-to-noise ratio.

7. The method of claim 1, wherein a time the operation was performed last is maintained for each zone, wherein the information on the writes maintained for each zone comprises a number of writes indicating the number of writes performed since the operation was last performed with respect to the zone, and wherein determining the change of the signal-to-noise ratio for the subject zone further comprises;
   determining the time elapsed for the subject zone;
   using a thermal decay equation with the determined time elapsed to estimate the change in the signal-to-noise ratio;
   determining the number of writes for the subject zone; and
   using an equation that takes into account an effect of a write operation on adjacent bits as a function of the determined number of writes to estimate the change in the signal-to-noise ratio.

8. A method for performing error correction in a storage device having a magnetic storage medium, comprising:
   defining a plurality of zones in the magnetic storage medium, wherein each zone comprises a plurality of addressable locations in the magnetic storage medium;
   maintaining a time an operation to improve a signal-to-noise ratio was performed for each zone;
   determining a time elapsed since the last operation to improve the signal-to-noise ratio for a subject zone;
   using a thermal decay equation with the determined time elapsed to estimate a change in the signal-to-noise ratio;
   determining whether the estimated change of the signal-to-noise ratio for the subject zone exceeds a threshold; and
   performing the operation to improve the signal-to-noise ratio with respect to the subject zone of the magnetic storage medium after determining that the change of the signal-to-noise ratio exceeds the threshold.

9. A method for performing error correction in a storage device having a magnetic storage medium, comprising:
   estimating a change of a signal-to-noise ratio for at least part of the magnetic storage medium based on a combination of changes to the signal-to-noise ratio estimated from at least two different decay equations based on different factors;
   determining whether the change of the signal-to-noise ratio exceeds a threshold;
   performing an operation with respect to the magnetic storage medium after determining that the change of the signal-to-noise ratio exceeds the threshold; and
   maintaining a time that has elapsed since the operation was last performed and an number of writes performed with respect to the magnetic storage medium since the operation was last performed, wherein one decay equation estimates the change in the signal-to-noise ratio as a function of the time that has elapsed and another decay equation estimates the signal-to-noise ratio as a function of the number of writes.

10. The method of claim 9, wherein the equation that estimates the change in the signal-to-noise ratio as the function of the time that has elapsed comprises a thermal decay equation and wherein the equation that estimates the change in the signal-to-noise ratio as the function of the number of writes considers an effect of a write operation on adjacent locations.

11. The method of claim 11, wherein the effect of the write operation on adjacent locations is modeled on a magnetic field strength of the write head in a storage device and a size of magnetic grains in the magnetic storage medium.

12. The method of claim 9, wherein the storage device comprises a magnetic disk drive and wherein the steps of estimating the change in the sign-to-noise ratio, determining whether the change exceeds a threshold, and performing the operation are initiated by a disk controller in the magnetic disk drive.

13. The system of claim 12, further comprising:
   means for maintaining a time the operation was performed last for each zone, wherein the information on the writes maintained for each zone comprises a number of writes for each zone indicating the number of writes performed since the operation was last performed with respect to the zone, and wherein the means for determining the change of the signal-to-noise ratio for the subject zone further performs:
(i) determining the time elapsed for the subject zone;
(ii) using a thermal decay equation with the determined time elapsed to estimate the change in the signal-to-noise ratio;
(iii) determining the number of writes for the subject zone; and
(iv) using an equation that takes into account an effect of a write operation on adjacent bits as a function of the determined number of writes to estimate the change in the signal-to-noise ratio.

14. A system for performing error correction, comprising:
a storage device having a magnetic storage medium;
means for defining a plurality of zones in the magnetic storage medium, wherein each zone comprises a plurality of addressable locations in the magnetic storage medium;
means for determining a change of a signal-to-noise ratio for one subject zone using information on writes to the subject zone;
means for determining whether the determined change of the signal-to-noise ratio for the subject zone exceeds a threshold; and
means for performing an operation to improve the signal-to-noise ratio with respect to the subject zone of the magnetic storage medium after determining that the change of the signal-to-noise ratio exceeds the threshold.

15. The system of claim 14, wherein the means for determining the change of the signal-to-noise ratio for the subject zone estimates the change of the signal-to-noise ratio as a result of adjacent track interference.

16. The system of claim 14, wherein the operation performed comprises reading a binary value from each address in the zone and writing the read binary value back to each address in the zone.

17. The system of claim 16, wherein the operation further comprises verifying data at the address locations in the zone and performing data repair operations at the addresses in the zone if errors are detected during the operation.

18. The system of claim 16, further comprising:
means for performing an error recovery operation if a binary value from an address cannot be read to determine the binary value for the address; and
means for writing the determined binary value to the address in the zone.

19. The system of claim 14, wherein the information on the writes for each zone comprises a number of writes indicating the number of writes performed since the operation was last performed with respect to the zone, and wherein the means for determining the change of the signal-to-noise ratio for the subject zone further performs:
determining the number of writes for the subject zone; and
using an equation that takes into account an effect of a write operation on adjacent bits as a function of the determined number of writes to estimate the change in the signal-to-noise ratio.

20. A system for performing error correction, comprising:
a storage device having a magnetic storage medium;
means for defining a plurality of zones in the magnetic storage medium, wherein each zone comprises a plurality of addressable locations in the magnetic storage medium;
means for maintaining a time an operation to improve a signal-to-noise ratio was performed for each zone;
means for determining a time elapsed since the last operation to improve the signal-to-noise ratio for the subject zone;
means for using a thermal decay equation with the determined time elapsed to estimate the change in the signal-to-noise ratio;
means for determining whether the estimated change of the signal-to-noise ratio for the subject zone exceeds a threshold; and
means for performing the operation to improve the signal-to-noise ratio with respect to the subject zone of the magnetic storage medium after determining that the change of the signal-to-noise ratio exceeds the threshold.

21. A system for performing error correction, comprising:
a storage device having a magnetic storage medium;
means for estimating a change of a signal-to-noise ratio for at least part of the magnetic storage medium based on a combination of changes to the signal-to-noise ratio estimated from at least two different decay equations based on different factors;
means for determining whether the change of the signal-to-noise ratio exceeds a threshold;
means for performing an operation with respect to the magnetic storage medium after determining that the change of the signal-to-noise ratio exceeds the threshold; and
means for maintaining a time that has elapsed since the operation was last performed and a number of writes performed with respect to the magnetic storage medium since the operation was last performed, wherein one decay equation estimates the change in the signal-to-noise ratio as a function of the time that has elapsed and another decay equation estimates the signal-to-noise ratio as a function of the number of writes.

22. The system of claim 21, wherein the equation that estimates the change in the signal-to-noise ratio as the function of the time that has elapsed comprises a thermal decay equation and wherein the equation that estimates the change in the signal-to-noise ratio as the function of the number of writes considers an effect of a write operation on adjacent locations.

23. The system of claim 22, wherein the effect of the write operation on adjacent locations is modeled on a magnetic field strength of the write head in the storage device and a size of magnetic grains in the magnetic storage medium.

24. The system of claim 21, wherein the storage device comprises a magnetic disk drive and wherein the means for estimating the change in the signal-to-noise ratio, determining whether the change exceeds a threshold, and performing the operation include a disk controller in the magnetic disk drive.

25. An article of manufacture for performing error correction in a storage device having a magnetic storage medium, wherein the article of manufacture causes operations to be performed, the operations comprising:
defining a plurality of zones in the magnetic storage medium, wherein each zone
comprises a plurality of addressable locations in the magnetic storage medium;
determining a change of a signal-to-noise ratio for one subject zone using information on writes to the subject zone;

determining whether the determined change of the signal-to-noise ratio for the subject zone exceeds a threshold; and performing an operation to improve the signal-to-noise ratio with respect to the subject zone of the magnetic storage medium after determining that the change of the a signal-to-noise ratio exceeds the threshold.

26. The article of manufacture of claim 25, wherein determining the change of the signal-to-noise ratio for the subject zone comprises estimating the change of the signal-to-noise ratio as a result of adjacent track interference.

27. The article of manufacture of claim 25, wherein the operation performed comprises reading a binary value from each address in the zone and writing the read binary value back to each address in the zone.

28. The article of manufacture of claim 27, wherein the operation further comprises verifying data at the address locations in the zone and performing data repair operations at the addresses in the zone if errors are detected during the operation.

29. The article of manufacture of claim 27, further comprising:

performing an error recovery operation if a binary value from an address cannot be read to determine the binary value for the address; and writing the determined binary value to the address in the zone.

30. The article of manufacture of claim 25, wherein the information on the writes for each zone comprises a number of writes indicating the number of writes performed since the operation was last performed with respect to the zone, and wherein determining the change of the signal-to-noise ratio for the subject zone further comprises:

determining the number of writes for the subject zone; and using an equation that takes into account an effect of a write operation on adjacent bits as a function of the determined number of writes to estimate the change in the signal-to-noise ratio.

31. The article of manufacture of claim 25, wherein a time the operation was performed last is maintained for each zone, wherein, the information on the writes maintained for each zone comprises a number of writes indicating the number writes performed since the operation was last performed with respect to the zone, and wherein determining the change of the signal-to-noise ratio for the subject zone further comprises:

determining the time elapsed for the subject zone;

using a thermal decay equation with the determined time elapsed to estimate the change in the signal-to-noise ratio;

determining the number of writes for the subject zone; and using an equation that takes into account an effect of a write operation on adjacent bits as a function of the determined number of writes to estimate the change in the sign-to-noise ratio.

32. An article of manufacture for performing error correction in a storage device having a magnetic storage medium, wherein the article of manufacture causes operations to be performed, the operations comprising:

defining a plurality of zones in the magnetic storage medium, wherein each zone comprises a plurality of addressable locations in the magnetic storage medium;

maintaining a time an operation to improve a signal-to-noise ratio was performed for each zone;

determining a time elapsed since the last operation to improve the signal-to-noise ratio for the subject zone;

using a thermal decay equation with the determined time elapsed to estimate a change in the signal-to-noise ratio;

determining whether the estimated change of the signal-to-noise ratio for the subject zone exceeds a threshold; and performing the operation to improve the signal-to-noise ratio with respect to the subject zone of the magnetic storage medium after determining that the change of the signal-to-noise ratio exceeds the threshold.

33. An article of manufacture for performing error correction in a storage device having a magnetic storage medium, wherein the article of manufacture causes operations to be performed, the operations comprising:

estimating a change of a signal-to-noise ratio for at least part of the magnetic storage medium based on a combination of changes to the signal-to-noise ratio estimated from at least two different decay equations based on different factors;

determining whether the change of the signal-to-noise ratio exceeds a threshold; and performing an operation with respect to the magnetic storage medium after determining that the change of the signal-to-noise ratio exceeds the threshold; and maintaining a time that has elapsed since the operation was last performed and a number of writes performed with respect to the magnetic storage medium since the operation was last performed, wherein one decay equation estimates the change in the signal-to-noise ratio as a function of the time that has elapsed and another decay equation estimates the signal-to-noise ratio as a function of the number of writes.

34. The article of manufacture of claim 33, wherein the decay equation that estimates the change in the signal-to-noise ratio as the function of the time that has elapsed comprises a thermal decay equation and wherein the equation that estimates the change in the signal-to-noise ratio as the function of the number of writes considers an effect of a write operation on adjacent locations.

35. The article of manufacture of claim 34, wherein the effect of the write operation on adjacent locations is modeled on a magnetic field strength of the write head in the storage device and a size of magnetic grains in the magnetic storage medium.

* * * * *